March 24, 1964  R. A. McKINNON  3,125,853
INTERNAL BURNING ENGINE CONFIGURATION
Filed May 26, 1959  2 Sheets-Sheet 1

Inventor
Roy A. McKinnon

March 24, 1964 R. A. McKINNON 3,125,853
INTERNAL BURNING ENGINE CONFIGURATION
Filed May 26, 1959 2 Sheets-Sheet 2
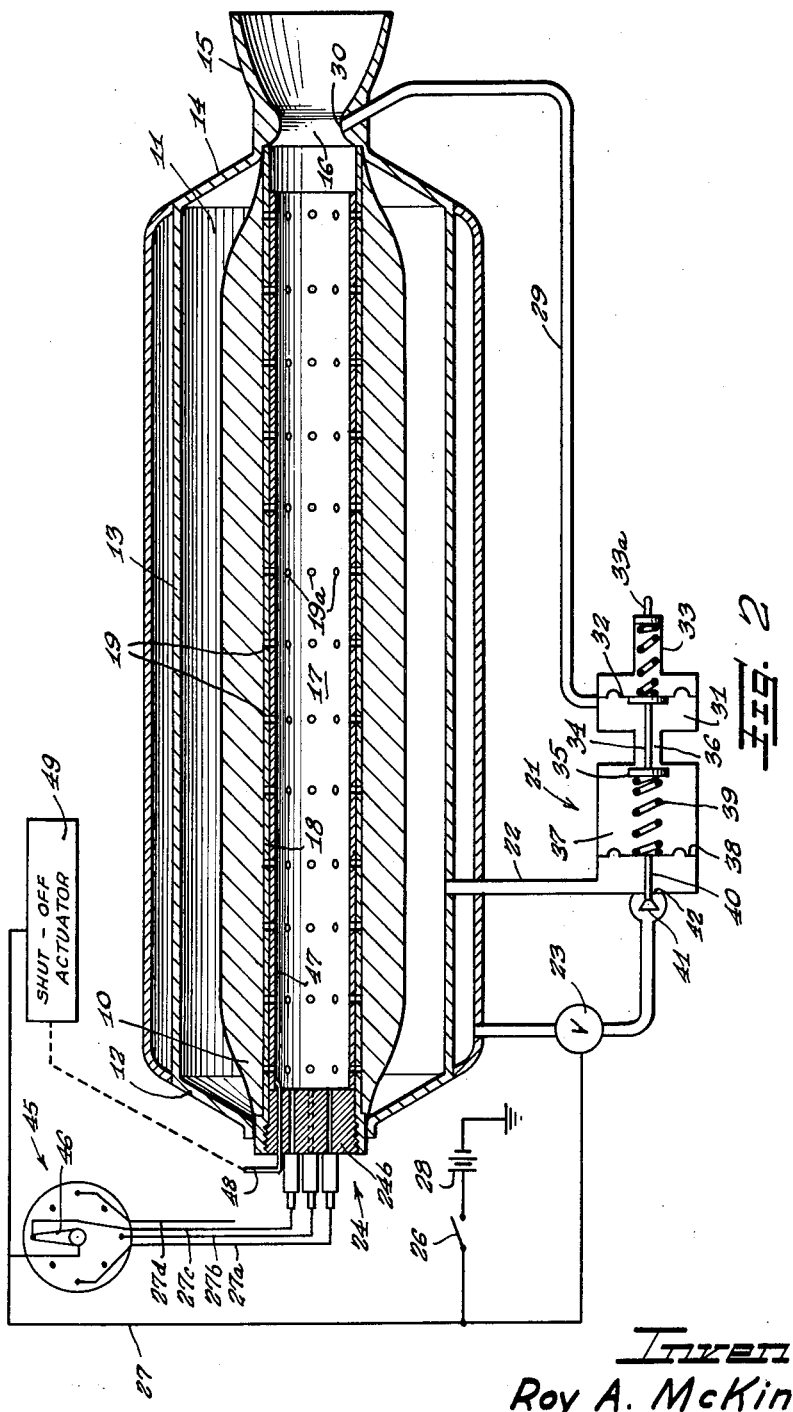
Inventor
Roy A. McKinnon

United States Patent Office 3,125,853
Patented Mar. 24, 1964

3,125,853
INTERNAL BURNING ENGINE CONFIGURATION
Roy A. McKinnon, Cleveland, Ohio, assignor to Thompson Ramo Wooldridge Inc., Cleveland, Ohio, a corporation of Ohio
Filed May 26, 1959, Ser. No. 815,855
4 Claims. (Cl. 60—35.6)

This invention relates to a rocket engine. More particularly, this invention relates to a rocket engine adapted to burn a gelatinous monopropellant fuel and wherein fuel extrusion apertures are arranged longitudinally of an elongated combustion chamber which is mounted entirely inside of an elongated fuel tank and extends axially from one end to the other thereof so that fuel can be extruded radially from all parts of said fuel tank directly into said combustion chamber.

It is a feature of the present invention to provide gas generating apparatus such as a rocket engine wherein a fuel tank which may be of cylindrical shape is adapted to preferably contain a gelatinous monopropellant fuel which has flow and consistency characteristics such that it can be extruded into an axial centrally extending combustion chamber through a plurality of burner tubes, apertures, or the like, by any convenient means such as a resilient bladder or rubber diaphragm which surrounds the fuel in the fuel tank and which may be collapsed by application of a gas under pressure in back of the bladder. Such an arrangement has particular application to situations where it is desired to achieve high values of thrust resulting from a large fuel burning area in a rocket engine configuration which may be long, narrow and elongated for desirable aerodynamic characteristics. Such a pencil-like configuration obviously has a minimal cross-sectional area or diameter. Hence, it has been found, that where the combustion chamber extends axially of the fuel tank and inside of it a total fuel extrusion area may be obtained which is larger than the cross-sectional area of the rocket engine. Furthermore, where such an internal combustion chamber extends axially for the full length of the rocket engine, the mounting of the combustion chamber is considerably improved and simplified by virtue of the fact that its two ends can be anchored in the end walls of the fuel tank and also the extrusion of the fuel in the fuel tank is enhanced and simplified by virtue of the fact that the fuel from all portions of the fuel tank can be radially directly extruded into the combustion chamber. It is therefore an object of this invention to provide a rocket engine structure capable of producing high thrust from a relatively large combustion chamber burning area in a rocket of generally slender elongated configuration wherein the combustion chamber extends axially from one end of the fuel tank to the other.

It is a further object of this invention to provide such a rocket engine in which a cylindrical combustion chamber is mounted inside of and extends axially the full length of a cylindrical fuel tank from which gelatinous fuel may be extruded by a bladder actuated by pressurized gas stored in an annular tank surrounding the fuel tank.

It is a further object of this invention to provide gas generating apparatus in which a gelatinous monopropellant fuel may be extruded into a combustion chamber from a fuel tank surrounding the combustion chamber through apertures in walls of the combustion chamber positioned so that fuel in any portion of the fuel tank may be extruded through one of the apertures along a direct radial path.

Other objects, features, and advantages of the present invention will be more fully apparent to those skilled in the art from the following detailed description taken in connection with the accompanying drawing in which like reference characters refer to like parts throughout and wherein:

FIGURE 2 is a central axial longitudinal sectional view of a second embodiment of a rocket engine in accordance with the present invention.

Figure 1:
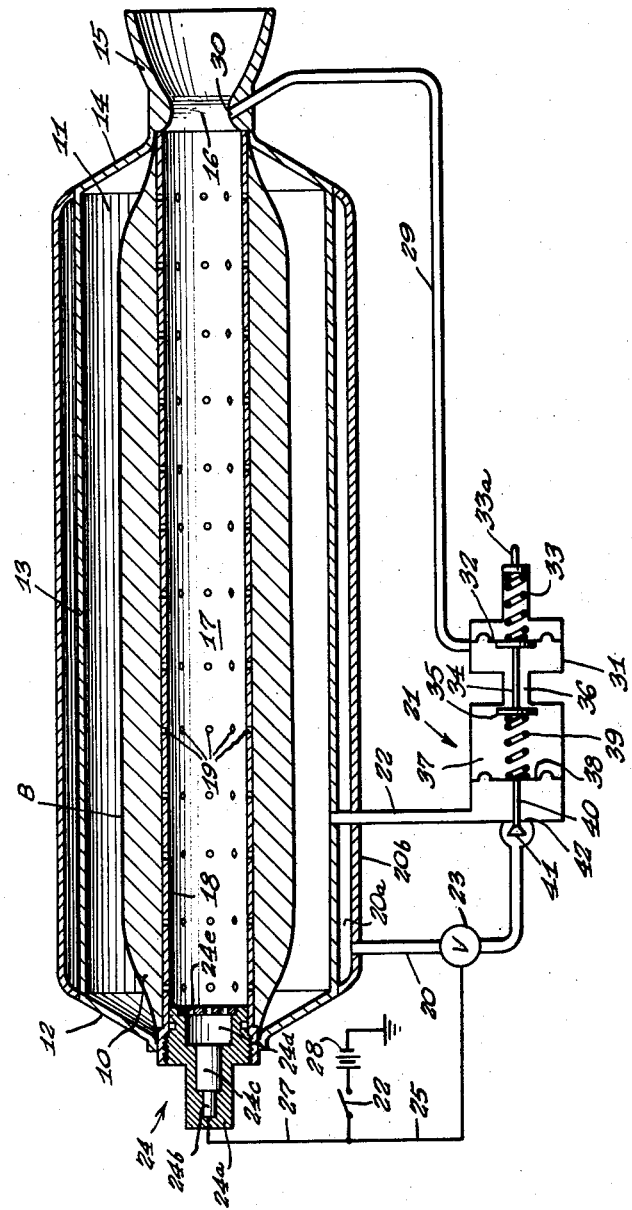
FIGURE 1 is a central axial longitudinal sectional view of a first embodiment of rocket engine in accordance with the present invention.

The term monopropellant refers to a composition which is substantially self-sufficient with regard to its oxidant requirements as distinguished from bipropellants where the fuel is maintained separately from the oxidizer source until admixture at the point of combustion. Generation of gases for producing thrusts as in a jet engine or prime mover of any type has hitherto generally been accomplished either by burning atomized sprays of mobile liquid mono- or bipropellant injected from a storage tank or tanks into the combustion chamber or by combustion of a solid propellant grain housed in the combustion chamber. Although each of these methods possesses desirable advantages relative to the other, each is also characterized by undesirable features. More recently there has been developed various plastic or gelatinous extrudable monopropellant fuels which combine many of the advantages and eliminates many of the disadvantages of the more commonly known liquid and solid fuels. The present invention is directed to a rocket engine structure adapted to burn such a gelatinous monopropellant to generate thrust. Although the engine structure is not restricted to use with any particular monopropellant, it is nonetheless true that the monopropellant used should possess certain requisite physical characteristics. It should be sufficiently cohesive to retain its shape for an appreciable length of time when extruded. Preferably also, its cohesive strength should be sufficiently high to withstand fragmentation under the given conditions in the combustion chamber. This is of importance not only for control of the desired burning surface area, but to avoid loss or wastage of unburned propellant by venting of the material out of the nozzle under such conditions as high acceleration. This is frequently a problem in the case of the burning of atomized mobile liquid propellants, some unburned particles of which fly out of the rocket nozzle. The degree of cohesive strength desirable is determined to some extent by the particular stresses developed in a particular use and the particular burning conditions as, for example, the unsupported length of the extruding, burning mass. Cohesive strength is closely related to the tensile strength of the material. In general, for the desired shape-retentivity, the monopropellant material should preferably have a minimum tensile strength of about 0.01 lb./sq. in., preferably about 0.03 p.s.i. or higher.

The cohesiveness or substantial tensile strength of the monopropellant maintains stability and uniform dispersion of its components as, for example, in the case of two-phase systems containing dispersed insoluble, solid oxidizer. This is of considerable importance, since it ensures uniformity of burning rate at the constantly generating burning surface as the end-burning material advances, thereby assuring a constant or controllable rate of gas generation.

The monopropellant, furthermore, should be extrudable at ambient temperatures, namely, should be capable of continuous flow, preferably under relatively moderate pressure differentials. Materials which are extrudable only at elevated temperatures or which require excessively high pressures to initiate and maintain flow present problems which make them generally unsuitable. In general, it is desirable to employ a material which flows at a maximum shear stress of about 10 p.s.i. at the wall of the tube or orifice through which it is being extruded.

The controllable feeding of a monopropellant having both shape-retentiveness and fluidity under stress substantially eliminates still another difficulty encountered with solid propellants housed in the combustion chamber, namely, the dangers of fracturing or cracking of the solid propellant which can so enormously increase burning surface area and the amount of gases produced as to cause explosion of the combustion chamber. The brittleness and fissuring characteristics of many solid propellants at low ambient temperatures is no problem with monopropellants having the physical characteristics requisite for my purpose since they can either be formulated so as to have exceedingly low freezing points or, upon warming to ambient temperatures of use, regain their flow characteristics and form a continuous, unbroken mass during pressure extrusion.

Substantially any monopropellant composition having the requisite physical characteristics, as for example, gelled liquid monopropellants such as hydrazine nitrate, nitromethane, or ethylene oxide containing a suitable gelling agent can be employed. One of the important advantages of the invention, however, stems from the fact that it makes possible the utilization of propellant compositions possessing the highly desirable characteristics of solid propellants in terms, for example, of the high density and high impulse required for high performance levels and reduced storage volume requirements with the important concomitant advantages of propellant feed control and, thereby, control of gas generation under varying circumstances.

Double-base propellant compositions comprising nitrocellulose gelatinized with nitroglycerin with or without, but preferably with, an inert, non-volatile plasticizer such as triacetin, diethyl phthalate, dibutyl phthalate or dibutyl sebacate, to reduce impact sensitivity, in proportions producing a soft gel having the requisite shape retentiveness and flow characteristics are suitable for use. Such relatively high-density, high-impulse propellants have hitherto been utilized only as solid propellants with the predesigning, pre-sizing and other disadvantages entailed by this mode of use.

In general, gel compositions comprising about 3 to 25% nitrocellulose dissolved in nitroglycerin, desirably diluted with at least about 10%, preferably at least 20 to 30% by weight based on total liquid, of an inert plasticizer solvent to reduce sensitivity, possess the requisite physical properties. Such soft gel compositions also have the advantage of being admixable with finely divided insoluble solid oxidizer such as the ammonium, sodium and potassium perchlorates and nitrates, to provide for combustion of the inert plasticizer, while retaining the desired shape-retentive, extrudable characteristics. Other highly active propellant liquids, such as pentaerythritol trinitrate, 1,2,4-butanetriol trinitrate, and diethylene-glycol dinitrate, which normally are too sensitive for use as mobile liquid monopropellants, can also be gelatinized with nitrocellulose, with or without inert plasticizer diluent and with or without finely divided solid, insoluble oxidizer, to provide monopropellants of substantially higher density than presently usable mobile liquid monopropellants.

Still another advantage of the apparatus lies in the fact that it makes possible combustion with controllable feeding and gas generation rates of heterogeneous monopropellants which are characterized not only by high density and high impulse, but also by the high autoignition temperature, low shock- and impact-sensitivity, non-corrosiveness and nontoxity of many of the presently used solid composite-type propellants, which make them safe to handle to transport and to store for extended periods of time under substantially any environmental temperature conditions likely to be encountered. By heterogeneous is meant a two-phase system wherein a finely divided, solid oxidizer is dispersed in an organic liquid fuel in which the oxidizer is insoluble. Spraying or atomization into a combustion chamber of dispersions of a solid oxidizer in a liquid fuel, even where the solid oxidizer is present in sufficiently small amounts so that the slurry is free-flowing, is not feasible. The solid oxidizer tends to clog the small atomization orifices. Comminution of the composition into a finely divided spray in the combustion chamber also posed reaction problems because of the difficulty in maintaining the solid oxidizer phase and the liquid phase in properly proportioned contact for complete oxidation.

Heterogeneous monopropellant compositions which are particularly advantageous comprise stable dispersions of finely divided, insoluble solid oxidizer in a continuous matrix of a nonvolatile, substantially shock-insensitive liquid fuel, the composition having sufficiently high cohesive strength to form a plastic mass which maintains the solid oxidizer in stable, uniform dispersion and which, while capable of continuous flow at ambient temperatures under stress, nevertheless retains a formed shape for an appreciable length of time. The compositions, which preferably are soft gels, possess the characteristics of non-Newtonian liquids, namely yield to flow only under a finite stress.

The liquid fuel can be any oxidizable liquid which is preferably high boiling and substantially nonvolatile, which is preferably free-flowing or mobile at ordinary temperatures, and which is substantially inert or insensitive to shock or impact. The latter characteristic can be achieved by employing an oxidizable liquid, at least about 50% by weight of which is an inert compound requiring an external oxidizer for combustion. For special applications, an active liquid fuel containing combined oxygen available for combustion of other components of the molecule, such as nitroglycerin, diethylene glycol dinitrate, pentaerythritol trinitrate or 1,2,4-butanetriol trinitrate, can be admixed with the inert fuel component, such dilution serving substantially to nullify the sensitivity of the active component.

The inert liquid fuel is preferably an organic liquid which, in addition to carbon and hydrogen, can contain other elements such as oxygen, nitrogen, sulfur, phosphorus or silicon and which meets the aforedescribed requirements in terms of physical and chemical properties. Such liquid fuels include hydrocarbons, e.g., triethyl benzene, dodecane and the like; compounds containing some oxygen linked to a carbon atom, such as esters, e.g., dimethyl maleate, diethyl phthalate, dibutyl oxalate, dibutyl sebacate, etc.; alcohols, e.g., benzyl alcohol, diethylene glycol, triethylene glycol, etc., ethers, e.g., methyl o-naphthyl ether; ketones, e.g., benzyl methyl ketone, phenyl o-tolyl ketone, isophorone; acids, e.g., 2-ethylhexoic acid, caproic acid, n-heptylic acid, etc., aldehydes, e.g., cinnamaldehyde; nitrogen-containing organic compounds such as amines, e.g., N-ethylphenylamine, tri-n-butylamine, diethyl aniline; e.g., caprinitrile; phosphorus-containing compounds, e.g., triethyl phosphate; sulfur-containing compounds, e.g., diethyl sulfate; pentamethyl disiloxyl-methyl methacrylate, viscous liquid polymers, such as polyisobutylene, and many others.

The solid oxidizer can be any suitable, active oxidizing agent which yields oxygen readily for combustion of the fuel and which is insoluble in the liquid fuel vehicle. Suitable oxidizers include the inorganic oxidizing salts, such as ammonium, sodium, potassium and lithium perchlorate or nitrate, and metal peroxides such as barium peroxide. The solid oxidizer should be finely divided, preferably with a maximum particle size of about 300 to 600 microns, to ensure stable, uniform dispersion of the oxidizer despite lengthy storage periods, although some somewhat larger particles can be maintained in gelled compositions without separation.

The amount of liquid fuel vehicle in the composition is critical only insofar as an adequate amount must be present to provide a continuous matrix in which the solid phase is dispersed. This will vary to some extent with the particular solids dispersed, their shape and degree of subdivision and can readily be determined by routine test formulation. The minimum amount of liquid required generally is about 8%, usually about 10%, by weight. Beyond the requisite minimum any desired proportion of liquid fuel to dispersed solid can be employed, depending on the desired combustion properties, since the desired cohesive, shape-retentive properties can be obtained by additives such as gelling agents. Where the requisite cohesiveness and plasticity are obtained by proper size distribution of the finely divided solid, without an additional gelling agent, the amount of solid incorporated should be sufficient to provide the consistency essential for shape-retentiveness. This will vary with the particular liquid vehicle, the particular solid and its size distribution and can readily be determined by routine testing. The requisite physical properties of the plastic heterogeneous monopropellant can also be obtained without the use of a gelling agent by employing a viscous liquid vehicle, such as a relatively low molecular weight liquid polymer.

Thixotropic, plastic, sharp-retentive compositions having the desired flow characteristics can be made by incorporating sufficient finely divided solid, insoluble oxidizer into the liquid fuel to make an extrudable mass when particles are so distributed that the minimum ratio of size of the largest to the smallest particles is about 2:1 and preferably about 10:1. At least 90% of the particles by weight should preferably have a maximum size of about 300 microns. Above this, a small proportion by weight up to about 600 microns can be tolerated.

It is sometimes desirable to incorporate a gelling agent in the solid oxidizer-liquid fuel dispersion. Such gels possess the desired dispersion stability, cohesiveness, shape-retentiveness and flow characteristics. Any gelling agent which forms a gel with the particular liquid fuel can be employed. Examples of compatible gelling agents include natural and synthetic polymers such as polyvinyl chloride; polyvinyl acetate; cellulose esters, e.g., cellulose acetate and cellulose acetate butyrate; cellulose ethers, e.g., ethyl cellulose and carboxymethyl cellulose; metal salts of higher fatty acids such as the Na, Mg and Al stearates, palmitates and the like; salts of naphthenic acid; casein; karaya gum; gelatin; bentonite clays and amine-treated bentonite clays; etc. Organic gelling agents are preferred since they can also serve as fuels. The amount of gelling agent employed is largely determined by the particular liquid fuel, the particular gelling agent, the amount of dispersed solid, and the specific physical properties desired.

Particle size distribution of the dispersed solids is generally not an important factor in imparting cohesive, plastic properties to the composition and in minimizing separation where a gelling agent is employed since these factors are adequately provided for by the gel. Even some substantially large solid particles as, for example, up to about 1000 microns, can be held in stable dispersion. However, the presence of different size particles is often desirable because of the improved packing effect obtained, in terms of increased amounts of solids which can be incorporated.

Finely divided, solid metal powders, such as Al, Mg, Zr, B, Be, Ti, Si, or the like, can be incorporated in the monopropellant compositions as an additional fuel component along with the liquid fuel. Such metal powders possess the advantages both of increasing density and improving the specific impulse of the monopropellant because of their high heats of combustion. The metal particles should preferably be within a size range of 0.25 to 50 microns. The amount of such metal fuel added is not critical but is determined largely by the specific use and the requisite physical characteristics of the composition as aforedescribed. For example, it should not be incorporated in such large amounts that the mixture either becomes granular in texture or deficient in amount of oxidizer. In general, the maximum amount of metal powder which can be introduced while maintaining the desired physical properties of the composition and an adequate amount of solid oxidizer is about 45% by weight, and depends upon the density of the metal and its chemical valence or oxidant requirement for combustion.

The amount of oxidizer can be less than stoichiometric so long as sufficient is introduced to maintain active combustion and a desired level of gas generation. The presence of an active liquid fuel component, namely a fuel containing oxygen available for combustion, reduces, of course, the amount of solid oxidizer required.

A gelatinous monopropellant fuel having the foregoing characteristics is indicated generally by the reference character 10 in the drawings. The fuel 10 is stored in a generally cylindrical fuel tank 11 having a front wall 12, a longitudinally extending side wall 13, and a rearward wall 14. The rearward wall 14 may merge integrally with or be rigidly attached to a nozzle 15 having a throat 16 which is preferably positioned substantially at the center of the rearward wall 14 of the fuel tank and which is in open communication with the interior of a combustion chamber 17 defined by a generally cylindrical tubular member 18 which may conveniently extend from the point at which the rearward wall 14 merges with the nozzle 15 axially and centrally of the fuel tank to the forward wall 12 thereof.

The combustion chamber wall member 18 defines a plurality of extrusion apertures 19 through which the combustion chamber 17 is in open communication with a portion of the fuel tank 11. The material of the combustion chamber wall member 18 is preferably a high strength solid material characterized by low thermal conductivity. The monopropellant, of course, is extruded from the fuel chamber at a rate at least as high as its linear burning rate and preferably higher in order to prevent any tendency of the fuel to burn back into the fuel tank. The low thermal conductivity of the extrusion plate wall member 18 is desirable to prevent conduction of heat from the combustion chamber along the walls of the orifices or passages 19 through which the propellant is extruded so that the propellant in contact with these walls within the extrusion orifices is not heated to ignition temperatures. The thermal conductivity of the materials forming the extrusion plate should be not greater than 3 B.t.u./hr. sq. ft. ° F./ft., and preferably not greater than 1. This requirement excludes metals and other materials such as graphite which are excessively heat conductive for my purposes. Many refractory and ceramic materials such as silicates, fire clays, Alundum, magnesite, silica, quartz, and zirconia, possess the requisite low thermal conductivity as well as excellent strength properties and can be cast or machined into extrusion plate wall members suitable for my purpose. Many solid organic compounds are also suitable for use in fabricating the wall member 18. Organic compounds, such as many polymers, having the requisite physical properties, in terms of strength and thrustness, can be employed as the basic structural material for this member. Polymers which are particularly suitable for this purpose include polyamides, such as nylon; acrylic methacrylic resins, such as polymethyl methacrylate; cellulose esters, such as cellulose acetate, propionate and butyrate; cellulose ethers, such as ethyl cellulose; epoxy resins; polyesters, such as the alkyd resins; vinyl polymers, such as polystyrene and polyvinyl chloride; fluorohydrocarbons, such as polytetrafluoroethylene (Teflon); silicones; and the like. Many of these organic materials have been experimentally found to be particularly suited for my present purpose. It should be understood, however, that neither the chemical composition per se nor the choice of either the gelatinous monopropellant fuel per se nor the material of the combustion chamber wall 18 per se forms any part of the present invention, these materials and their chemical and physical action and properties as such having been developed by others and being known in the art. The present invention, rather, is directed to the overall rocket engine configuration shown in the drawing and to the manner of utilizing these above materials which results from the configuration shown.

It should at this point be noted that if for a given choice of fuel the resulting combustion chamber pressures become too high for the available mechanical strength of a material desired for use in the combustion wall 18 because of its thermal properties it is of course possible to back the wall member 18 shown by a stronger reinforcing member of metal or any other suitable material. Furthermore, should the combustion chamber temperatures exceed those which can conveniently be dealt with by adjusting the thickness of the wall member 18 and suitably selecting its material for low thermal conductivity, then either as a part of or in addition to such strength reinforcing backing, the fuel tank side of the combustion chamber wall member can also readily be provided with heat exchange conduits or fins. Such a heat exchange conduit system, for example, could consist of a plurality of pipes or ducts disposed between the extrusion apertures 19 and extending from the forward wall of the rocket engine to the rearward wall thereof being at all points in contact and in heat exchange relation with the combustion chamber wall member 18. The heat exchange medium circulated through such pipes could, in suitable applications, be the ambient atmosphere or a heat exchange medium carried in any suitable reservoir in or around the rocket engine. Of course, if heat exchange fins are used they may connect with portions projecting from the rocket engines to dissipate heat to the outside. Normally, however, such heat dissipating auxiliary apparatus is not necessary and is therefore not shown in the drawings.

Turning again to FIGURE 1, it will be noted that the monopropellant 10 in the fuel chamber 11 is packed between the combustion chamber wall 18 and an extrusion member or bladder B. The bladder B is preferably a sleeve of resilient deformable material such as rubber or the like which in general annularly surrounds the combustion chamber wall 18 so that at any stage of the operation of the rocket engine the fuel 10 is snugly packed between the wall 18 and the bladder B inside the fuel tank 11. The ends of the bladder B are conveniently secured to the ends of the wall member 18 at the forward and rearward portions thereof. For example, the forward end of the bladder B may conveniently be sealed between the forward wall 12 of the seal chamber 11 and the forward extremity of cylindrical member 18 at the point where these two members are welded or otherwise joined together. Similarly, the rearward end of the bladder B may be sealed between the point where the wall member 18 is secured to the shoulder formed by the junction of the rearward wall 14 of fuel tank 11 where it joins the nozzle.

The bladder B is adapted to be deformed by pressurized gas which may, for example, be admitted to the space between it and the side wall 13 of fuel tank 11 through a pipe or conduit 22 which is connected through a control mechanism 21, main valve 23, and conduit 20 to a pressurized gas chamber or container 20a which may conveniently be in the form of an annular chamber surrounding the side wall 13 of the fuel tank 11 and forming a double wall construction therewith for the fuel tank. The gas contained in chamber 20a may be air but is preferably an inert gas such as nitrogen or the like. The resilient bladder B is preferably made of a material which is either naturally or has been treated to be gas impervious.

Screw threadedly mounted in the forward end of the combustion chamber wall 18 is an igniter plug 24. The igniter 24 is housed in a plug member 24a which is securely mounted in sealed relationship with the combustion chamber wall 18 so as to form the forward wall of the combustion chamber during operation of the rocket. The igniting device 24 may be of any design which will provide for ignition of the monopropellant mixture 10 when it is extruded through the extrusion orifices 19. In the particular device shown, application of an electric current from a battery or voltage source 28 through a switch 26 and over conductor 27 to a heating element 24b serves to ignite a combustible mixture in a chamber 24c which in turn may ignite a secondary combustible mixture in a chamber 24d. The hot gaseous products of this combustion are allowed to escape through passages 24e and are at sufficiently high pressure to carry the full length of the combustion chamber and to impinge on the exposed surface of monopropellant being extruded through the orifices 19 and thereby ignite the engine.

While the above described squib type of igniter is satisfactory in many applications and has the advantage of leaving the extrusion orifices 19 completely free, nonetheless it will be realized that any suitable type of igniter other than the squib type described could also be used. In particular, if it is desired to make the front wall 12 of the rocket engine one solid piece, it may in some applications be more desirable to use a hot wire type of igniter wherein a resistance wire is stretched across the opening of each of the extrusion orifices 19 and connected in electrical circuit to a source of power. This wire may then act as a flow divider to shape the column or plug of fuel being extruded during normal operation of the rocket and also serves as an igniting element when current is applied thereto to start the operation of the rocket in a manner per se well known in the art.

As noted above, the gas storage tank 20a is connected through conduit 20 to the pressure regulator 21 and thence through conduit 22 to enter the periphery of the fuel tank in back of the bladder B. The valve 23 interposed in the conduit 20 may conveniently be of the cartridge fired shut-off type which in storage and ground handling is normally in closed position. Shut-off valve 23 may be controlled in a common electrical circuit which also controls the igniter 24 mounted at the forward end of the combustion chamber 17. Thus, the igniter 24 is connected by wire 27 and the valve 23 is connected by wire 25 to a switch 26 which in turn is connected when in the closed position to the battery or voltage source 28 the other side of which is grounded. Of course, one side of the igniter element 24b and one side of the cartridge fired shut-off valve 23 must also be grounded.

When switch 26 is closed, an electrical signal is simultaneously applied to the cartridge fired shut-off valve 23 and to the igniter 24. This simultaneously opens the shut-off valve 23 and actuates the igniter 24 which will generate hot combustion gases for a sufficient period of time to permit them in turn to ignite the monopropellant which is extruded through the apertures 19 by the pressurized gas applied to the bladder B.

The thrust produced by the rocket engine is a function of the combustion chamber pressure which in turn is a function of the rate of gas generation in the combustion chamber as determined by the mass burning rate of the fuel for any given fuel. In order to achieve optimum thermodynamic operating characteristics for this type of gas generating apparatus, however, there are distinct limits to the rate at which the fuel 10 can be extruded. That is to say, the minimum value of the extrusion rate (as determined by the magnitude of the gas pressure applied to the bladder B) should be at least equal to the linear burning rate of the extruded column of the fuel in order to minimize any tendency of the fuel to burn back into the fuel tank. On the other hand, the extrusion rate should not greatly exceed this linear burning rate since if it does so a plug or column of fuel will be extruded more rapidly than it can be burned and will eventually project into the combustion chamber where it is likely to be broken off from the oncoming mass of fuel by virtue of its own weight or accelerations resulting from motion of the rocket. It is therefore desirable from the point of view of maximum efficiency of operation and of greatest assurance of actually burning all of the fuel in the fuel tank during long range operation, to maintain the extrusion rate at a value approximately equal to the linear burning rate of any given fuel. Of course, some increase above this value for temporary increases in thrust can be tolerated but, as noted, only at a sacrifice of efficiency of operation.

However, since the factors which determine the mass burning rate of the fuel for any given rocket engine as a whole are necessarily the above discussed extrusion rate and the total burning surface available in any given combustion chamber, it follows that in order to maximize the thrust producing capabilities of an engine while still retaining maximum efficiency of operation, it is desirable to maximize the total burning area available in the combustion chamber, it follows that in order to maximize the thrust producing capabilities of an engine while still retaining maximum efficiency of operation, it is desirable to maximize the total burning area available in the combustion chamber insofar as such an increase is consistent with thermodynamic requirements and with the aerodynamic configuration and structural characteristics of the rocket engine. Such a maximizing of the total burning area is achieved by the structure shown in FIGURE 1 wherein an elongated generally cylindrical or tubular combustion chamber 17 extends axially of the concentric fuel and gas tanks 11 and 20a and extends from end to end thereof. Furthermore, such an axial combustion chamber extending the full length of the fuel tank ensures that throughout the full cycle of operation of the rocket engine all of the fuel 10 in the fuel tank 11 can be extruded on a direct straight radial line to an extrusion orifice 19. It will of course be understood that the extrusion orifices 19 shown in FIGURE 1 are by way of schematic representation only and that in practice these orifices can be quite closely spaced and comprise a much larger number of orifices than as shown. It is desirable to space the orifices perhaps some 50 mils apart in order to assure that the columns of fuel extruded from the separate orifices will remain in separate columns and will not coalesce in the combustion chamber. Other than this, the orifices may as noted be spaced as closely as desired. It will of course be appreciated that in view of the highly viscous nature of the flow characteristics of the gelatinous monopropellant fuels for which the engine is adapted, the shorter extrusion distance and the direct radial path of extrusion to the combustion chamber also contribute to maximizing the overall efficiency of the rocket engine.

In order to maintain the thrust at a preselected value which may be either a fixed constant value such that the extrusion rate is maintained at or near the linear burning rate for maximum efficiency of operation as explained above, or which may be varied to any other higher value if desired, a conduit or pipe 29 is connected through an orifice 30 to be in communication with the upstream portion of the throat 16 of nozzle 15 at the point where it communicates with the rearward end of the combustion chamber 17. The other end of pipe 29 is in open communication with one side of a thrust regulator actuating chamber 31 having a diaphragm 32 mounted thereacross immediately to the right of the inlet from the pipe 29, as viewed in FIGURE 1. An adjustable calibrated compression spring 33 urges the diaphragm 32 to the left as seen in FIGURE 1 whereas the combustion chamber gas pressure as applied through pipe 29 to the chamber 31 urges the diaphragm to the right as seen in FIGURE 1. Mounted at one end thereof centrally on diaphragm 32 is a valve stem 34 having a throttle valve member 35 at its opposite end and extending freely through a restricted passage 36. As will be observed, the valve member 35 opposes seat at the inlet from the passage 36 to a primary chamber 37 of the thrust regulator 21. A second diaphragm member 38 is positioned to divide the chamber 37 into two portions. A compression spring 39 is connected between the valve 35 and one side of the diaphragm 38. A valve stem 40 carrying a valve 41 is connected to the other side of the diaphragm 38. Valve 41 is positioned to cooperate with a valve seat 42 at the inlet into the chamber 37 from the gas conduit 20 at the point where it enters the thrust regulator 21.

In operation, the adjustable calibrated spring 33 is set for a desired value of thrust as by adjustment of the position of a plunger 33a bearing against the spring 33. This loads the spring 33, diaphragm 32, valve stem 34, valve 35, spring 39, and diaphragm 38, and valve stem 40 to open the nitrogen valve 41 so as to admit nitrogen under pressure from the conduit 20 into the chamber 37 at the left side of the diaphragm 38 as seen in FIG. 1, and thence through line 22 to apply pressure to the bladder B thereby causing the extrusion of fuel 10 into the combustion chamber 17. Burning of the fuel in the combustion chamber builds up pressure therein which is communicated through line 29 to the chamber 31 to act on the diaphragm 32 and when such pressure is great enough to overcome the thrust of the spring 33 it will urge the diaphragm toward the right in FIGURE 1 thereby tending to urge the valve 35 and the valve 41 toward their closed position to reduce the pressure of the nitrogen being supplied through line 22 and thereby reduce the rate of fuel extrusion. When the desired value of rocket thrust has been achieved, as indicated by the desired value of combustion chamber pressure, the pressure acting on the left side of the diaphragm 32 is equal to the pressure applied to the right side of the diaphragm by spring 33 and the diaphragm 32 is in equilibrium. In this equilibrium position, the valve 41 is positioned to maintain a nitrogen pressure sufficient to produce a rate of fuel extrusion which will just maintain the desired thrust. However, it will be apparent that the pressure in nitrogen tank 20a itself falls as more and more nitrogen is used during the course of the rocket's travel. By way of example, the initial pressure of the nitrogen may be 2000 p.s.i. and the final pressure at the end of expulsion may be as low as 400 p.s.i. Such pressures may be used, for example, where it is desired to maintain a combustion chamber pressure in the neighborhood of 300 p.s.i. It is apparent that as long as fuel extrusion is desired to continue, the nitrogen pressure must be greater than the combustion chamber pressure in order to overcome the back pressure from the combustion chamber on the fuel.

It will, of course, be understood that the thrust regulator calibrated spring 33 may either be permanently adjusted by manual means before firing the rocket in order to maintain a fixed predetermined value of thrust, or that any suitable remote calibrated actuating means may be provided to actuate a plunger 33a so as to vary the adjustment of the spring 33 to produce a program to variation of thrust during the flight of the rocket. For any given setting of the adjustable thrust regulator spring 33, either a fixed or programmed variable setting, the control system shown in FIGURE 1 acts as a servo-system to maintain the combustion chamber pressure at the desired value independently of changes in the nitrogen supply pressure from tank 20a during the course of operation.

The rocket engine shown in FIGURE 1 is intended primarily for those applications wherein the rocket engine once ignited continues to burn until all of the monopropellant 10 in the fuel tank 11 has been consumed. In certain applications it may be desirable to completely terminate the operation of the engine before all of the fuel is consumed and then to reignite the engine for another period of operation prior to reloading or ground handling of the rocket. A rocket engine particularly adapted for such intermittent operation and reignition is shown in FIGURE 2. It will be noted that the fuel tank 11, the combustion chamber 17 and the nozzle 15 as well as the annular gas tank 20a and the control system regulating the rate of extrusion are the same in both embodiments. In the rocket shown in FIGURE 2, however, it will be noted that the ignition plug 24 is, by way of example, divided into four sections each of which is a complete ignition squib connected by the separate lines or wires 27a, 27b, 27c, and 27d respectively to one of four terminals of a step selector switch 45 having a switch arm 46 which may, for example, be solenoid actuated to progress sequentially one position at a time through eight possible positions before alternate active terminals of which are shown connected by the single lead 27 through switch 26 to a battery or source of voltage 28. In the embodiment of FIGURE 2, the main valve 23 is preferably solenoid actuated rather than cartridge actuated so that when the switch 26 is closed it will simultaneously actuate the stepping switch 45 to move the arm 46 thereof from an open terminal to a terminal connected to the source of power for a predetermined interval of time and will simultaneously energize the solenoid of valve 23 to open the valve as long as the switch 26 remains closed. After one of the squibs has ignited the rocket engine a standard timing mechanism of the type well-known in the art may conveniently move the switch arm 46 to the next terminal which as shown in FIGURE 2 is again an open terminal. The step switch is thus caught and ready for the next cycle of operation.

It will also be noted that there is provided inside the combustion chamber 17 and concentric with and in contact with the interior of the combustion chamber wall 18 a cylindrical cut-off sleeve 47 which is mounted for reciprocating action in the combustion chamber 17. The cut-off member 47 may consist of the same material from which the combustion chamber wall 18 is fabricated or it may be of metal or any other convenient material. It will be noted that the cut-off member 47 is terminated short of the end of the combustion chamber and is provided with a plurality of orifices 19a which in the position shown are in registry with the extrusion orifices 19 in the wall of the combustion chamber so that the two sets of orifices combine to form continuous open passages. In order to achieve a faster and more positive cut-off action of the rocket engine than could be achieved by simply stopping the extrusion of the fuel, the cut-off member may be conveniently slid lengthwise from the rear of the combustion chamber for a distance at least sufficient so that the sets of orifices are no longer in registry and so that the solid portion of the member 47 blocks any further extrusion of the fuel 10.

The motion of the cut-off member 47 may conveniently be controlled by an arm 48 which is journalled for reciprocating motion in the plug member 24b and which is mechanically linked to an electrically actuated shut-off actuator 49. The shut-off actuator 49 is indicated only schematically in block form since it may comprise and is well-known in the art as, for example, a spring biasing and solenoid arrangement whereby the arm 48 is normally spring biased to urge the cut-off member 47 to the rear of the combustion chamber 17 by a spring urging the arm 48 inwardly in the plug member 24b and a solenoid connected to be actuated when switch 26 is closed which opposes the action of the spring to hold the cut-off member in the operative or on position shown in FIGURE 2.

Reviewing the operation of the device then, it will be understood that the action of the thrust regulator 21 is the same as has been described in connection with FIGURE 1. Similarly, the over-all rocket structure and thermodynamic considerations during any period of operation are also the same. There has been added to the showing in FIGURE 1 only the provision for complete shut-off of the rocket or complete termination of combustion and thrust and reignition in flight. To this end, the single igniter plug is replaced by a multiple igniter plug the individual portions or stages of which are selectable through a step actuating switch. In its off position, the cut-off member 47 is spring biased to the rear of the combustion chamber thereby closing the orifices 19, the master switch 26 and solenoid valve 23 are closed and the switch arm 46 of step selector switch 45 is on an open terminal. When the switch 26 is closed a solenoid is actuated which opens the valve 23, another solenoid is actuated which advances the switch arm 46 to a live terminal which supplies heating power to one of the igniter elements and a solenoid in the shut-off actuator 49 is actuated which draws the cut-off member 47 forwardly in the combustion chamber to permit extrusion of the fuel 10 into the chamber. The rocket then continues to operate in the same manner as discussed above in connection with FIGURE 1 as long as the switch 26 remains closed. Of course, as noted above, after the rocket has been ignited a spring operated timing mechanism in the selector switch may conveniently advance its switch arm 46 to the next open terminal to prevent a waste of electrical heating power in the igniter. When the switch 26 is opened, however, the operation of the rocket engine is completely terminated since the solenoid of the valve 23 is deactivated and the spring bias of the valve returns it to a closed position. Similarly, the solenoid of the shut-off actuator 49 is deactivated and its biasing spring returns the cut-off member 47 to the rear of the combustion chamber so that the extrusion orifices 19 are blocked by the member 47. If it is desired to again start the operation of the rocket engine, it is only necessary to close the switch 26 which, of course, may be operated either manually or by remotely controlled means in accordance with the needs of any particular application.

It will of course be understood that in FIGURES 1 and 2, various portions of the auxiliary control apparatus have been shown externally of the outer casing of the rocket engine in order to clarify the drawings. In practice, it will of course be realized that conduits such as the pipe 29 and the feed through conduits from the gas chamber 20a to the fuel tank as well as the associated control mechanisms would be housed inside the fuel tank either positioned in an enlargement protruding from the forward end thereof or (in the case of conduit 29 for example) running along the outer periphery of the inner wall of the fuel tank. Similarly, the control circuitry and mechanism shown for intermittent operation of the rocket in FIGURE 2 can conveniently be housed in a casing forming an extension of the rocket around the firing plug 24. In any such arrangement, however, it will be understood that it is intended to retain the essential characteristics of the construction wherein the combustion chamber extends axially throughout the entire length of a fuel tank to achieve the above-noted desirable characteristic of direct radial extrusion into a combustion chamber having and affording a maximum burning area of fuel for the desired aerodynamic configuration.

While a particular exemplary preferred embodiment of the invention has been described in detail above, it will be understood that modifications and variations therein may be effected without departing from the true spirit and scope of the novel concepts of the present invention as defined by the following claims.

I claim as my invention:
1. A rocket engine comprising,
   a generally cylindrically gelatinous monopropellant fuel storage tank,
   a generally cylindrical combustion chamber wall member,
   said combustion chamber wall member being coaxially mounted inside said fuel tank and extending axially the full length thereof,
   said combustion chamber wall member defining a plurality of apertures along the entire axial length thereof arranged and communicating with the interior of said fuel storage tank,
   a resilient deformable impervious extrusion member within said fuel storage tank, said extrusion member surrounding said combustion chamber wall member and extending the entire axial length of the fuel storage tank to confine therein the gelatinous monopropellant fuel and said extrusion member spaced radially from the fuel storage tank wall and positioned between said fuel tank wall and the combustion chamber wall, means comprising an annular pressurized gas chamber surrounding and forming a double wall with said fuel storage tank wall and having a controlled passage effecting communication with the tank to exert pressure in said space between the fuel tank wall and said extrusion member to extrude fuel from said fuel tank through said apertures and into said combustion chamber along the entire axial length of said combustion chamber, means to ignite said fuel in said combustion chamber to generate gases, one end of said combustion chamber being closed and the other end of said combustion chamber being in open communication with a nozzle positioned to receive said gases, said nozzle having its other end open to the ambient to discharge said gases of combustion to produce thrust.

2. A rocket engine comprising, a generally cylindrical gelatinous monopropellant fuel storage tank, a generally cylindrical combustion chamber wall member, said combustion chamber wall member being coaxially mounted inside said fuel tank and extending axially the full length thereof, said combustion chamber wall member defining a plurality of apertures along the entire axial length thereof and communicating with the interior of the fuel storage tank, a sleeve member snugly received within and slidably mounted within said combustion chamber wall member, said sleeve defining a plurality of apertures, the apertures in said wall member and sleeve member being co-aligned to form continuous passages in one position of said sleeve member and being out of alignment in another position of said sleeve member whereby said apertures in said wall member are blocked, means to move said sleeve member from said one to said other position, a resilient deformable impervious extrusion member within said fuel storage tank, said extrusion member surrounding the combustion chamber wall member and extending the entire axial length of the fuel storage tank and said combustion chamber and said extrusion member spaced radially from the fuel storage tank wall and positioned between said fuel tank wall and the combustion chamber to envelop the fuel, means comprising an annular pressurized gas chamber surrounding and forming a double wall with said fuel storage tank wall and having a controlled passage effecting communication with the tank to exert pressure in said space between the fuel tank wall and said extrusion member to extrude fuel from said fuel tank through said apertures and into said combustion chamber along the entire axial length of said combustion chamber, means to ignite said fuel in said combustion chamber to generate gases, one end of said combustion chamber being closed and the other end of said combustion chamber being in open communication with a nozzle positioned to receive said gases, said nozzle having its other end open to the ambient to discharge said gases of combustion to produce thrust.

3. A rocket engine comprising, a generally cylindrical gelatinous monopropellant fuel storage tank, a generally cylindrical combustion chamber wall member, said combustion chamber wall member being coaxially mounted inside said fuel tank and extending axially the full length thereof, said combustion chamber wall member defining a plurality of apertures along the entire axial length thereof arranged and communicating with the interior of said fuel storage tank, a resilient deformable impervious extrusion member within said fuel storage tank, said extrusion member surrounding the combustion chamber wall member and extending the entire axial length of the fuel storage tank and said combustion chamber and spaced radially from the fuel storage tank wall and positioned between said fuel tank wall and the combustion chamber to envelop the fuel, means comprising a pressure source and a passage leading therefrom through the fuel tank wall to exert pressure in said space between the fuel tank wall and said extrusion member to extrude fuel from said fuel tank through said apertures and into said combustion chamber along the entire axial length of said combustion chamber, means to ignite said fuel in said combustion chamber to generate gases, one end of said combustion chamber being closed and the other end of said combustion chamber being in open communication with a nozzle positioned to receive said gases, said nozzle having its other end open to the ambient to discharge said gases of combustion to produce thrust, and a pressure regulator in said passage including
    a valve to control the pressure from said source to said space
    and control valve operating means connected to the valve and including
        a pressure sensitive structure
        and a conduit communicating with the combustion chamber end of said nozzle and said pressure sensitive structure to actuate the pressure sensitive structure to operate the valve and modify the pressure exerted in said space whereby to maintain the extrusion rate of the fuel through the apertures at substantially the same rate as the linear burning rate of said fuel in said combustion chamber whereby the rocket engine operates with maximum efficiency.

4. A rocket engine comprising, a generally cylindrical gelatinous monopropellant fuel storage tank, a generally cylindrical combustion chamber wall member, said combustion chamber wall member being coaxially mounted inside said fuel tank and extending axially the full length thereof, said combustion chamber wall member defining a plurality of apertures along the entire axial length thereof, a sleeve member snugly received within and slidably mounted within said combustion chamber wall member, said sleeve defining a plurality of apertures, the apertures in said wall member and sleeve member being co-aligned to form continuous passages in one position of said sleeve member and being out of alignment in another position of said sleeve member whereby said apertures in said wall member are blocked, means to move said sleeve member from said one to said other position, a resilient deformable impervious extrusion member within said fuel storage tank, said extrusion member surrounding the combustion chamber wall member and extending the entire axial length of the fuel storage tank and said combustion chamber and said extrusion member spaced radially from the fuel storage tank wall and positioned between said fuel tank wall and the combustion chamber to envelop the fuel, means comprising an annular pressurized gas chamber surrounding and forming a double wall with said fuel storage tank wall and having a controlled passage effecting communication with the tank to exert pressure in said space between the fuel tank wall and said extrusion member to extrude fuel from said fuel tank through said apertures and into said combustion chamber along the entire axial length of said combustion chamber, means to ignite said fuel in said combustion chamber to generate gases, one end of said combustion chamber being closed and the other end of said combustion chamber being in open communication with a nozzle positioned to receive said gases, said nozzle having its other end open to the ambient to discharge said gases of combustion to produce thrust, and a pressure regulator in said passage including a valve to control the pressure from said source to said space and control valve operating means connected to the valve and including a pressure sensitive structure and a conduit communicating with the combustion chamber end of said nozzle and said pressure sensitive structure to actuate the pressure sensitive structure to operate the valve and modify the pressure exerted in said space whereby to maintain the extrusion rate of the fuel through the apertures at substantially the same rate as the linear burning rate of said fuel in said combustion chamber whereby the rocket engine operates with maximum efficiency.

References Cited in the file of this patent

UNITED STATES PATENTS

| | | |
|---|---|---|
| 2,409,036 | Goddard | Oct. 8, 1946 |
| 2,589,215 | Atwood | Mar. 18, 1952 |
| 2,671,312 | Roy | Mar. 9, 1954 |
| 2,753,801 | Cumming | July 10, 1956 |
| 2,821,350 | Smurik | Jan. 28, 1958 |
| 2,892,410 | Sloan et al. | June 30, 1959 |

FOREIGN PATENTS

| | | |
|---|---|---|
| 582,621 | Great Britain | Nov. 22, 1946 |